Patented Feb. 24, 1948

2,436,764

UNITED STATES PATENT OFFICE 2,436,764

STABILIZATION OF FURAN

Harry B. Copelin, Niagara Falls, N. Y., assignor to E. I. du Pont de Nemours & Company, Wilmington, Del., a corporation of Delaware No Drawing. Application April 29, 1946, Serial No. 665,903

2 Claims. (Cl. 260—345)

This invention relates to the stabilization of heterocyclic organic compounds and in particular to the stabilization of furan.

Furan, a compound which is useful in synthetic organic chemistry and in special cases as a solvent, is known to be unstable under ordinary conditions of storage. Freshly purified furan is a colorless liquid which undergoes polymerization and acquires an undesirable color on standing for relatively short periods of time even when protected from exposure to light. This tendency to become colored and contaminated with polymerization products obviously is undesirable since for most uses, the furan must therefore be purified and used immediately. Thus when furan is to be used at a distance from the point of production, time and labor are required for an additional purification and also economic losses are incurred since part of the product is always lost during the handling and purification.

It is one of the objects of this invention to provide a novel method for the stabilization of furan. Another object of the invention is to prevent polymerization and undesirable color of furan during shipment or storage. A further object is to provide a stabilized furan composition. An additional specific object of the invention is to provide a novel stabilizer for furan. These and other objects will be apparent from the ensuing description of the invention.

The above objects are attained in accordance with my invention by incorporating into furan pyridine.

I have discovered that when small amounts of pyridine are added to furan polymerization and color formation are prevented. Furan which is stabilized with pyridine in accordance with my invention may be stored over relatively long periods of time without deterioration.

Various concentrations of pyridine stabilizer may be utilized. In general, about 0.01 to 1.0% of pyridine based on the weight of furan is satisfactory, and I prefer to utilize concentrations within this range. However, concentrations greater than 1% may be utilized although in general higher concentrations usually have no advantage. Although less than 0.01% exerts some stabilizing action, I have found it desirable for consistently good results to utilize more than 0.01%.

The following example is illustrative of my invention.

Example

A sample of furan was distilled and the purified product divided to provide several smaller samples. These samples were immediately placed in plain glass bottles containing strips of iron and a space was left in each bottle between the stopper and the upper level of the furan sample so that the furan was continuously in contact with air. Pyridine in a concentration of 0.1% was added to each sample and the closed bottles containing the stabilized furan and iron were allowed to stand at room temperature in diffused light. At the end of 30 days, no color or polymer formation could be detected. Samples of furan placed in glass or iron containers without any added stabilizer developed color and polymer formation within a few hours.

Since polymer formation in furan is always accompanied by the appearance of color the presence of polymerization products can be readily detected by a determination of the color characteristics of the furan. This may be accomplished simply by comparison of a given sample of furan with a freshly purified sample or with a standard.

The present invention provides a simple and economical method for the stabilization of furan so that the material may be stored for relatively long periods or shipped long distances without color formation or polymerization in appreciable amounts. By the utilization of my invention, it is unnecessary to redistill or further purify stabilized furan prior to use.

I claim:

1. The method of stabilizing furan which comprises incorporating therein 0.01 to 1.0% of pyridine by weight.

2. A new stable furan composition comprising furan having incorporated therein 0.01 to 1.0% by weight of pyridine.

HARRY B. COPELIN.

REFERENCES CITED

The following references are of record in the file of this patent:

The Nature of Furfuryl Alcohol, by Dunlop et al., 1942, page 817, Div. 50.